(12) United States Patent
Zupanc et al.

(10) Patent No.: US 8,479,490 B2
(45) Date of Patent: Jul. 9, 2013

(54) COMBUSTORS WITH IMPINGEMENT COOLED IGNITERS AND IGNITER TUBES FOR IMPROVED COOLING OF IGNITERS

(75) Inventors: Frank J. Zupanc, Phoenix, AZ (US); Paul R. Yankowich, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1618 days.

(21) Appl. No.: 11/694,528

(22) Filed: Mar. 30, 2007

(65) Prior Publication Data

US 2009/0064657 A1 Mar. 12, 2009

(51) Int. Cl.
F02C 7/264 (2006.01)
F02C 7/12 (2006.01)

(52) U.S. Cl.
USPC ........................................ 60/39.821; 60/39.83

(58) Field of Classification Search
USPC .............. 60/39.821–39.828, 39.83, 796, 798, 60/799, 800; 431/258, 264
See application file for complete search history.

(56) References Cited

U.S. PATENT DOCUMENTS

| | | | | |
|---|---|---|---|---|
| 2,587,331 A * | 2/1952 | Jordan | ............................ | 219/75 |
| 2,831,993 A * | 4/1958 | Lentz | ............................ | 313/11.5 |
| 2,835,110 A * | 5/1958 | Barberis | .................... | 60/39.826 |
| 3,007,312 A * | 11/1961 | Shutts | ........................ | 60/39.821 |
| 3,736,748 A | 6/1973 | Walker et al. | | |
| 3,800,530 A * | 4/1974 | Nash | ................................ | 60/761 |
| 3,990,834 A | 11/1976 | DuBell et al. | | |
| 4,099,373 A | 7/1978 | Griffin, Jr. et al. | | |
| 4,141,213 A * | 2/1979 | Ross | ........................ | 60/39.821 |
| 5,001,896 A | 3/1991 | Hilt et al. | | |
| 5,367,869 A | 11/1994 | Defreitas | | |
| 6,182,436 B1 | 2/2001 | Prociw et al. | | |
| 6,266,961 B1 | 7/2001 | Howell et al. | | |
| 6,557,350 B2 | 5/2003 | Farmer et al. | | |
| 6,715,279 B2 | 4/2004 | White | | |
| 6,920,762 B2 | 7/2005 | Wells et al. | | |
| 7,013,634 B2 | 3/2006 | Pidcock et al. | | |
| 7,101,173 B2 | 9/2006 | Hernandez et al. | | |
| 7,546,739 B2 * | 6/2009 | Holland et al. | .................. | 60/772 |
| 7,640,752 B2 * | 1/2010 | Gautier et al. | .................. | 60/796 |
| 2006/0016190 A1 | 1/2006 | Howell et al. | | |
| 2007/0051110 A1 | 3/2007 | Holland | | |
| 2007/0068166 A1 | 3/2007 | Gautier et al. | | |
| 2010/0095680 A1 | 4/2010 | Rudrapatna | | |
| 2010/0212324 A1 * | 8/2010 | Bronson et al. | .................. | 60/752 |

* cited by examiner

Primary Examiner — Gerald Sung
(74) Attorney, Agent, or Firm — Ingrassia Fisher & Lorenz, P.C.

(57) ABSTRACT

A combustor for a gas turbine engine is provided, and includes an inner liner; an outer liner circumscribing the inner liner and forming a combustion chamber with the inner liner; a fuel igniter comprising a tip portion configured to ignite an air and fuel mixture in the combustion chamber; and an igniter tube positioning the fuel igniter relative to the combustion chamber, the igniter tube having a plurality of channels configured to direct cooling air toward the tip portion of the fuel igniter.

15 Claims, 2 Drawing Sheets

COMBUSTORS WITH IMPINGEMENT COOLED IGNITERS AND IGNITER TUBES FOR IMPROVED COOLING OF IGNITERS

FIELD OF THE INVENTION

The present invention generally relates to combustors for gas turbine engines, and more particularly relates to combustors with impingement cooled igniters and igniter tubes for improved cooling of igniters.

BACKGROUND OF THE INVENTION

Combustors are used to ignite and burn fuel and air mixtures in gas turbine engines. Known combustors include inner and outer liners that define an annular combustion chamber in which the fuel and air mixtures are combusted. The inner and outer liners are spaced radially inwardly from a combustor casing such that inner and outer passageways are defined between the respective inner and outer liners and the combustor casing. Fuel igniters extend through the combustor casing and the outer passageway, and are coupled to the outer liner by igniter tubes attached to the combustor liner. More specifically, the fuel igniter tubes secure and maintain the igniters in alignment relative to the combustion chamber as well as provide a sealing interface for the igniter between the outer passageway and the combustion chamber.

During operation, high pressure airflow is discharged from a compressor into the combustor. A portion of the airflow enters the combustion chamber, where it is mixed with fuel and ignited by the igniters. Another portion of the airflow entering the combustor is channeled through the combustor outer passageway for attempting to cool the outer liner, the igniters, and diluting a main combustion zone within the combustion chamber. However, over time, continued operation may induce potentially damaging thermal stresses into the combustor that exceed an ultimate strength of materials used in fabricating the components of the combustor. For example, thermally induced transient and steady state stresses may cause low cycle fatigue (LCF) failure of the igniter.

Cooling the igniter, particularly the tip portion of the igniter closest to the combustion process, presents challenges. Some conventional igniters include a plurality of longitudinal slots extending down the length of the igniter to channel cooling air to the vicinity of the tip portion of the igniter. However, this arrangement is not very efficient because it requires a relatively large amount of cooling air to sufficiently cool the tip portion of the igniter. The large amount of air required to effectively cool the tip portion of the igniter in this manner may adversely impact the combustion conditions within the combustion chamber. Particularly, a large amount of cooling air may have a perturbative effect on the ignition process, gaseous emissions, and the temperature distribution of hot gases entering the turbine. In some arrangements, the quantity and manner in which cooling air is admitted into the combustor may result in a barrier formed around the igniter that prevents fuel from reaching the tip portion of the igniter. This can additionally reduce the effectiveness of the igniter for igniting the fuel and air mixture. Moreover, excess cooling air can disrupt the liner cooling film and result in local hot spots immediately downstream of the igniter in the combustor liner.

Accordingly, it is desirable to provide combustors with igniters that are efficiently cooled without adversely interfering with the combustion of the air and fuel mixtures in the combustion chamber. In addition, it is desirable to provide igniter tubes for improved cooling of igniters in combustors. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A combustor for a gas turbine engine is provided in accordance with an exemplary embodiment of the present invention. The combustor includes an inner liner; an outer liner circumscribing the inner liner and forming a combustion chamber with the inner liner; a fuel igniter comprising a tip portion configured to ignite an air and fuel mixture in the combustion chamber; and an igniter tube coupling the fuel igniter to the outer liner, the igniter tube having a plurality of channels configured to direct cooling air toward the tip portion of the fuel igniter.

An igniter tube for positioning a fuel igniter with respect to an outer liner of a combustor is provided in accordance with an exemplary embodiment of the present invention. The igniter tube includes an igniter boss having a first end portion for receiving the fuel igniter; a second end portion for coupling the igniter tube to the outer liner; a plurality of channels arranged between the first end portion and the second end portion for directing air toward a tip portion of the fuel igniter.

An igniter tube is provided in accordance with an exemplary embodiment of the present invention for mounting a fuel igniter to an outer liner of a combustor. The igniter tube includes an igniter boss defining a first plurality of holes and configured to be mounted on the annular outer liner; a supporting ring coupled to the igniter boss and defining a second plurality of holes in fluid communication with the first plurality of holes to form a plurality of channels. The plurality of channels is configured to direct cooling air onto an igniter tip of the fuel igniter. The igniter tube further includes a grommet supported by the supporting ring and configured to receive the fuel igniter.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
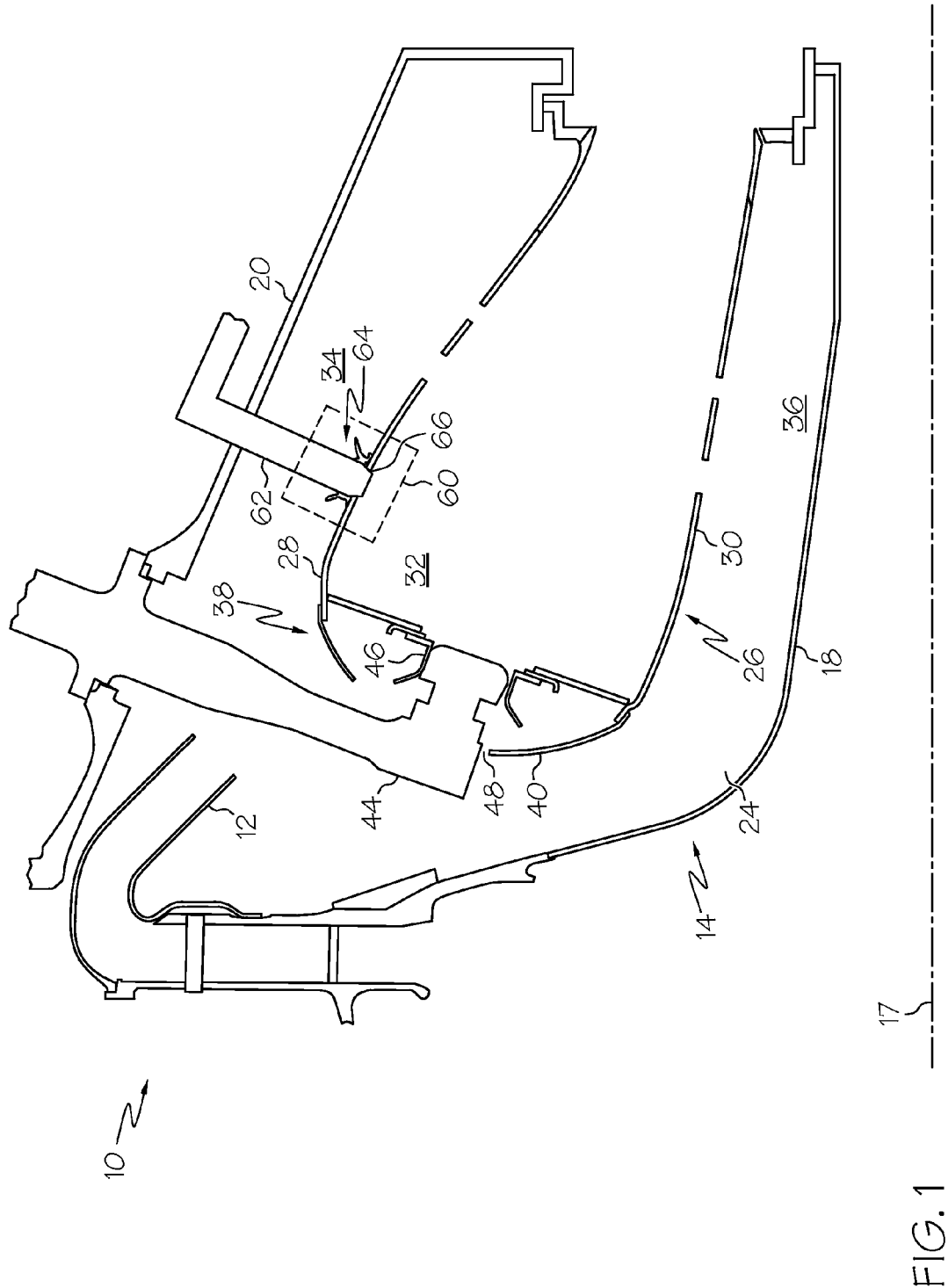
FIG. 1 is a cross-sectional view of a combustor for a gas turbine engine in accordance with an exemplary embodiment of the present invention.

FIG. 1 is a cross-sectional view of a combustor 14 for a gas turbine engine in accordance with an exemplary embodiment of the present invention. Although the depicted combustor 14 is an annular combustor, any other type of combustor, such as a can combustor, can be provided. In an exemplary embodiment, the combustor 14 can form part of, for example, an auxiliary power unit for an aircraft or a propulsion system for an aircraft. The combustor 14 comprises an inner case 18 that extends annularly about a central axis 17 of the combustor 14 and an outer case 20 concentrically arranged with respect to the inner case 18. The inner and outer cases 18 and 20 define an annular pressure vessel 24. The combustor 14 further includes an inner liner 30 and an outer liner 28 circumscribing the inner liner 30 within the annular pressure vessel 24. The outer liner 28 and the inner liner 30 define an annular combustion chamber 32. The outer and inner liners 28 and 30 cooperate with outer and inner cases 18 and 20 to define respective outer and inner air passageways 34 and 36.

The combustor 14 includes a front-end assembly 38 comprising an annularly extending shroud 40, at least one fuel injector 44, and at least one fuel injector guide 46. One fuel injector 44 and one fuel injector guide 46 are shown in the partial cross-sectional view of FIG. 1, although it is appreciated that more fuel injectors and fuel injector guides may be disposed about central axis 17 in within the combustor 14. The fuel injector 44 may also be coupled with a secondary air swirler (not shown) as is typical practice in gas turbine combustors. The shroud 40 extends between and is secured to the forwardmost ends of the outer and inner liners 28 and 30. The shroud 40 includes at least one shroud port 48 that accommodates the fuel injector 44 and introduces air into the forward end of the combustion chamber 32. The fuel injector 44 is secured to the outer case 20 and projects through the shroud port 48. The fuel injector 44 introduces a swirling, intimately blended fuel-air mixture that supports combustion in the combustion chamber 32.

A fuel igniter 62 extends through the outer case 20 and the outer passageway 34, and is coupled to the outer liner 28. It will be appreciated that more than one fuel igniter 62 can be provided in the combustor 14, although only one is illustrated in FIG. 1. The fuel igniter 62 is arranged downstream from the fuel injector 44 and is positioned to ignite a fuel and air mixture within the combustion chamber 32.

The fuel injector 62 is coupled to outer liner 28 by an igniter tube 64. More specifically, the igniter tube 64 is coupled within an opening 66 extending through outer liner 28, such that the igniter tube 64 is concentrically aligned with respect to the opening 66 of the outer liner 28. The igniter tube 64 maintains the alignment of the fuel igniter 62 relative to the combustor 14 and provides for a sealing interface between the igniter 62 and igniter tube 64 of the air in the outer passageway 34 and the combustion chamber 32. In one embodiment, the opening 66 of the outer liner 28 and the igniter tube 64 have substantially circular cross-sectional profiles. The igniter tube 64 is discussed in greater detail below.

During engine operation, airflow exits a high pressure diffuser and deswirl 12 (partially shown) at a relatively high velocity and is directed into the annular pressure vessel 24 of the combustor 14. The airflow enters the combustion chamber 32 through openings in the liners 28 and 30, where it is mixed with fuel from the fuel injector 44, and the airflow is combusted after being ignited by the fuel igniter 62. The combusted air exits the combustion chamber 32 and is delivered to a turbine (not shown).

Figure 2:
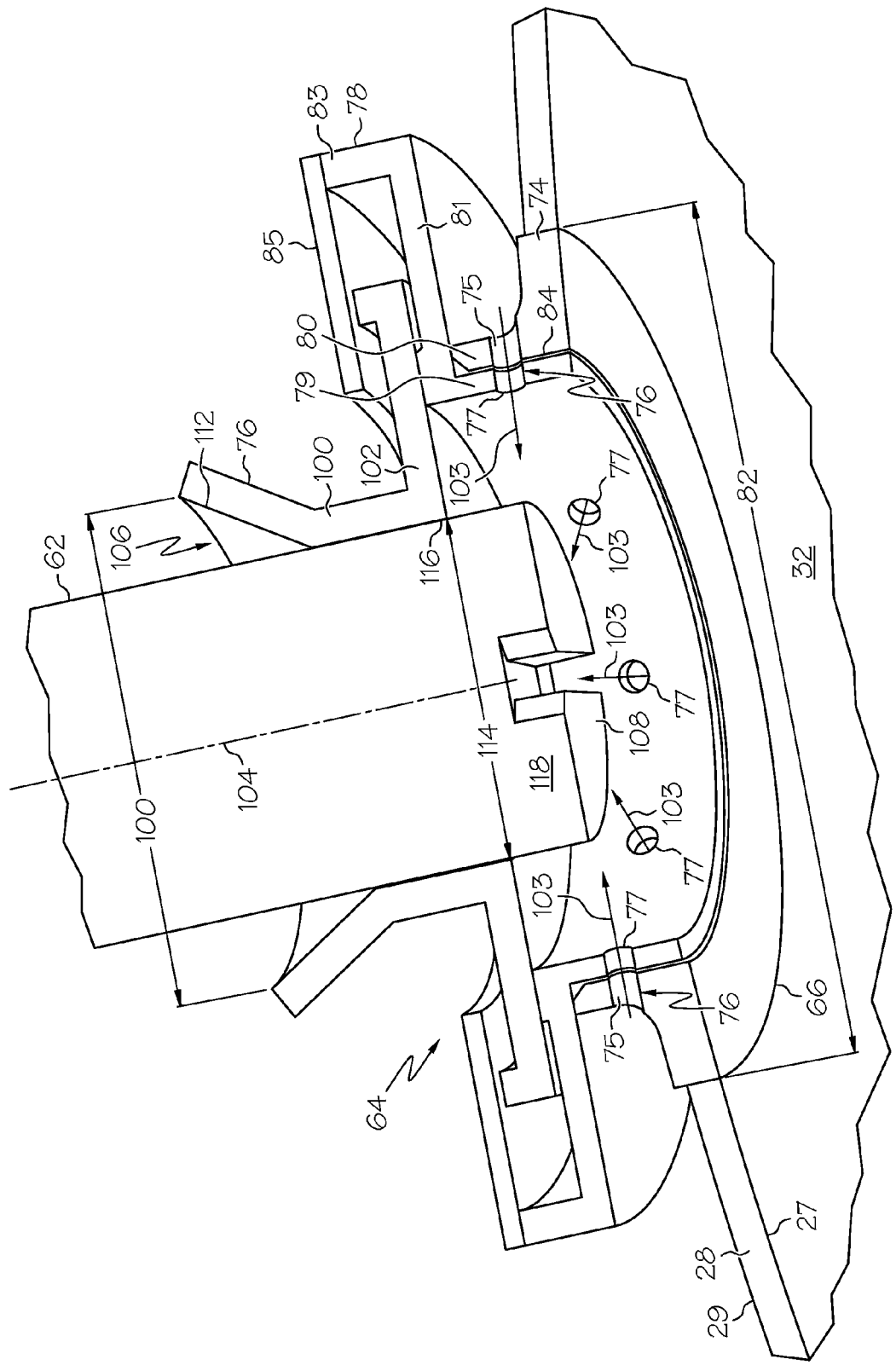
FIG. 2 is an enlarged isometric cross-sectional view of an igniter and igniter tube suitable for use in the combustor of FIG. 1 in accordance with an exemplary embodiment of the present invention.

FIG. 2 is an enlarged isometric cross-sectional view, represented by the dashed box 60 of FIG. 1, of the igniter tube 64 coupled to the outer liner 28. As noted above, the igniter tube 64 mounts the igniter 62 in the combustor 14, and particularly mounts the igniter 62 such that a tip portion 118 of the igniter 62 is exposed to the fuel and air mixture in the combustion chamber 32. The tip portion 118 may be slightly recessed, slightly protuding, or nominally flush with the inner surface of the outer liner 28. The igniter tube 64 includes an igniter boss 74, a grommet 76, and a supporting ring 78 extending therebetween. The igniter tube 64 will be typically manufactured from materials that are similar to those of the inner and outer liners 28 and 30, which are capable of withstanding the temperatures within the combustion chamber 32.

The igniter boss 74 mounts the igniter tube 64 to the outer liner 28. Particularly, an outer diameter 82 of the igniter boss 74 is approximately equal to a diameter of the opening 66 of the outer liner 28, and accordingly, the igniter boss 74 is received in close tolerance within opening 66 of the outer liner 28. In the exemplary embodiment, the igniter boss 74 has a substantially circular outer diameter corresponding to a diameter of the opening 66 of the outer liner 28. In an alternate embodiment, the igniter boss 74 is mounted onto a surface of the outer liner 28. For example, the igniter boss 74 may be mounted to an outside surface 29 or an inside surface 27 and may be mounted using adhesive, welding, screws, or any other suitable means for affixing the igniter boss 74 to the outer liner 28 and providing an adequate sealing interface. The igniter boss 74 includes a projection 80 that extends outwardly from the combustion chamber 32. The igniter boss 74 also includes an opening 84 extending therethrough. In one embodiment, the opening 84 is substantially circular. The opening 84 of the igniter boss 74 is sized to receive the supporting ring 78, and the projection 80 supports the supporting ring 78.

The supporting ring 78 of the igniter tube 64 includes a first portion 79, a second portion 81, a third portion 83, and a fourth portion 85. The first portion 79 of the supporting ring 78 is received by and is coupled to the igniter boss 74. The second portion 81 extends generally perpendicularly and radially outwardly from the first portion 79. The projection 80 of the igniter boss 74 supports the second portion 81 of the supporting ring 78. In an alternate embodiment, the projection of the igniter boss 74 is directly coupled to the second portion 81 of the supporting ring 78, and thus, the supporting ring 78 may not include a first portion 79. In a further alternate embodiment, the first portion 79 of the supporting ring 78 is mounted to or otherwise coupled directly to the outer liner 28 such that the igniter boss 74 is omitted. The third portion 83 of the supporting ring 78 extends generally perpendicularly from the second portion 81. The fourth portion 85 extends radially inward from the third portion 83 and is generally parallel to the second portion 81.

The grommet 76 of the igniter tube 64 includes a receiving ring 100 coupled to an attaching ring 102, which extends radially substantially perpendicular from the receiving ring 100. The attaching ring 102 of the grommet 76 extends radially between the second portion 81 and the fourth portion 85 of the supporting ring 100 and is substantially retained therebetween. An outside diameter of the receiving ring 100 is less than an inside diameter of the fourth portion 85 of the supporting ring 78. As a result of this arrangement, the grommet 76 may be able to move laterally with respect to the supporting ring 78 to accommodate manufacturing tolerances and movements during operation. In an alternate embodiment, the grommet 76 is fixed to the supporting ring 78 not movable laterally relative to the supporting ring 78, or in a further alternate embodiment, the grommet 76 is directly coupled to the igniter boss 74 and the supporting ring 78 is omitted. The receiving ring 100 includes a radially divergent portion that defines an opening 106. The opening 106 has a diameter 110 at a first end 112 of the receiving ring 100 that is larger than an inside diameter 114 at a second end 116. Accordingly, the attaching ring 102 of the grommet 76 can guide the fuel igniter 62 into the igniter tube 64 such that the tip portion 118 of the igniter tube 64 extends into the combustion chamber 32. The igniter tube 64 secures the fuel igniter 62 and maintains the fuel igniter 62 in alignment relative to the combustor 14 (FIG. 1). As noted above, although the illustrated embodiment illustrates the supporting ring 78, the grommet 76, and the igniter boss 78 as separate pieces, in an alternate embodiment, one or more of the supporting ring 78, the grommet 76, and the igniter boss 78 can be integral with one another.

The igniter tube 64 includes a plurality of channels 76 for directing air to the fuel igniter 62. In the illustrated embodiment, the channels 76 are defined by a first plurality of holes 77 and a second plurality of holes 75. The projection 80 of the igniter boss 74 includes the first plurality of holes 77 that extend generally perpendicularly through the projection 80. The first portion 79 of the supporting ring 78 includes the second plurality of holes 75 that are generally coaxially aligned in fluid communication with the first plurality of holes 77 in the igniter boss 74. During engine operation, as the airflow enters the combustor 14, a portion of the airflow is channeled through the outer passageway 34 of the combustor 14 (FIG. 1). As shown in FIG. 2, a portion 103 of the airflow from the combustor 14 flows through the first plurality of holes 77 in the igniter boss 74 and continues through the second plurality of holes 75 in the supporting ring 78. Subsequently, the portion 103 of airflow directly impinges the fuel igniter 62 mounted by the igniter tube 64 and cools the fuel igniter 62. The portion 103 of airflow can particularly be directed to, and cool, the tip portion 118 of the fuel igniter 62. In the illustrated embodiment, the channels 76 direct the airflow 103 essentially perpendicularly to the longitudinal axis 104 of the fuel igniter 62, although it can be appreciated that other angles can be provided to cool the igniter tip 118 of the fuel igniter 62.

Some fuel igniters 62 may have jackets (not shown) completely or partially covering the tip portion 118 of the fuel igniter 62. In these arrangements, the jacket can be at least partially removed to allow access of the cooling air to the tip portion 118 of the fuel igniter 62.

The holes 75 and 77 that form the channels 76 in the igniter tube 64 can be circular in diameter and circumferentially aligned about the fuel igniter 62. The holes 75 in the first portion 79 of the supporting ring 78 and the holes 77 in the igniter boss 74 do not have to be the same size and/or shape. For example, one set of holes 75 or 77 can be larger than the other set of holes 77 or 75 to facilitate alignment. In alternate embodiments, one of the sets of holes 75 or 77 can be omitted. For example, the igniter boss 74 can omit all or portions of the projection 80, and the holes 77 of the supporting ring 78 can form the channels 76. Alternatively, the supporting ring 78 can omit all or portions of the first portion 79, and the holes 75 of the igniter boss 74 can form the channels 76. Although the illustrated embodiment of the igniter tube 64 is depicted with three pieces (i.e., the igniter boss 74, the supporting ring 78, and the grommet 76) and two sets of holes 75 and 77, the igniter tube 64 can have any structural arrangement and combination of holes 75 and 77 that enable a portion 103 of airflow to impinge on the tip portion 118 of the fuel igniter 62.

In an exemplary embodiment, the channels 76 of the igniter tube 64 can cool the tip portion 118 of the fuel igniter 62 to temperatures less than, for example, 1500° F. In another exemplary embodiment, the channels 76 of the igniter tube 64 can cool the tip portion 118 of the fuel igniter 62 to temperatures such as, for example, 1200° F. Impingement cooling is more effective than conventional mechanisms, such as slot cooling, for cooling the igniter, and therefore, a reduced amount of air can be used to effectively cool the fuel igniter 62. In one exemplary embodiment, the amount of air necessary to cool the fuel igniter 62 in the combustor 14 is one third or one fourth of the amount of air necessary to cool igniters in conventional combustors. By reducing the amount of necessary cooling air 103 through the holes 75 and 77, the function of the igniter 62 and/or the combustion conditions in the combustion chamber 32 are not adversely affected. In one exemplary embodiment, ten holes 75 are provided in the inner portion of the supporting ring 78 and ten holes 77 are provided in the igniter boss 74. The size of the holes 75 and 77 can be, for example, about 0.04 inches (1 millimeter). A greater or fewer number of holes 75 and 77 can be provided, as well as different sizes. Different configurations and arrangements of the igniter tube 64 can be provided as necessary in dependence on the desired temperature of the fuel igniter 62 and the sensitivity of the combustor 14 to additional cooling air. Reduced temperatures in the fuel igniter 62 results in lower thermal stresses and improved life in a cost-effective and reliable manner.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a gas turbine engine, comprising: an inner liner; an outer liner circumscribing the inner liner and forming a combustion chamber with the inner liner, the outer liner being a single walled liner; a fuel igniter configured to ignite an air and fuel mixture in the combustion chamber to generate combustion gases, the fuel igniter including a tip portion exposed to the combustion gases; and an igniter tube positioning the fuel igniter relative to the combustion chamber, the igniter tube having a plurality of channels configured to direct cooling air such that the cooling air impinges the tip portion of the fuel igniter at an angle generally perpendicular to a longitudinal axis of the fuel igniter, wherein the igniter tube includes an annular igniter boss mounted on the outer liner, wherein the igniter boss comprises a plurality of holes that form, at least partially, the plurality of channels, a support ring supported by the igniter boss, and a grommet arranged on the supporting ring and configured to receive the fuel igniter, and wherein the igniter tip portion terminates at a distal end, and wherein the plurality of channels directs the cooling air on a position at or approximately at the distal end.

2. The combustor of claim 1, wherein the supporting ring comprises a plurality of holes that form, at least partially, the plurality of channels.

3. The combustor of claim 1, wherein the plurality of holes in the igniter boss is a first plurality of holes, and wherein the supporting ring comprises a second plurality of holes that are in fluid communication with the first plurality of holes to form the plurality of channels, wherein the first plurality of holes are aligned with the second plurality of holes.

4. The combustor of claim 1, wherein the grommet is configured to move laterally with respect to the supporting ring.

5. The combustor of claim 4,
wherein the supporting ring comprises a first portion, a second portion coupled to and extending perpendicularly from the first portion, and a third portion coupled to and extending perpendicularly from the second portion and substantially parallel to the first portion, and wherein the grommet comprises an attachment ring that is axially retained by, and laterally movable relative to, the first and third portions of the supporting ring.

6. The combustor of claim 1, wherein the grommet comprises diverging portions for guiding the fuel igniter into the igniter tube.

7. The combustor of claim 1, wherein the plurality of channels includes about ten channels arranged circumferentially around the fuel igniter.

8. The combustor of claim 1, wherein each of the plurality of channels has a diameter of about 1 millimeter.

9. The combustor of claim 1, wherein the plurality of channels is configured to direct a volume of cooling air sufficient to cool the tip portion of the fuel igniter to less than 1500° F.

10. An igniter tube for positioning a fuel igniter with respect to an outer liner of a combustor that forms a combustion chamber with an inner liner, comprising:
    an igniter boss having
        a first end portion for receiving the fuel igniter;
        a second end portion for coupling the igniter tube to the outer liner;
        a plurality of channels arranged between the first end portion and the second end portion for directing air such that the air directly impinges on a tip portion of the fuel igniter at a position within the combustion chamber,
    wherein the plurality of channels is configured to direct air perpendicularly toward a longitudinal axis of the fuel igniter, and wherein the igniter tube further comprises a supporting ring coupled to the igniter boss, and a grommet coupled to the supporting ring wherein the tip portion terminates at a distal end, and wherein the plurality of channels directs the cooling air on a position at or approximately at the distal end.

11. The igniter tube of claim 10, wherein the igniter boss comprises a plurality of holes that form, at least partially, the plurality of channels.

12. The igniter tube of claim 10, wherein the supporting ring comprises a plurality of holes that form, at least partially, the plurality of channels.

13. The igniter tube of claim 10, wherein the igniter boss comprises a first plurality of holes and the supporting ring comprises a second plurality of holes that are in fluid communication with the first plurality of holes to form the plurality of channels.

14. The igniter tube of claim 10, wherein the grommet is configured to move laterally with respect to the supporting ring.

15. An igniter tube for mounting a fuel igniter to an outer liner of a combustor, the fuel igniter configured to ignite an air and fuel mixture to generate combustion gases, the igniter tube comprising: an igniter boss defining a first plurality of holes and configured to be mounted on the annular outer liner; a supporting ring mounted on the igniter boss and defining a second plurality of holes aligned with the first plurality of holes to form a plurality of channels, the plurality of channels is configured to direct air perpendicularly toward a longitudinal axis of the fuel igniter, wherein the plurality of channels is configured to direct cooling air to directly impinge onto an igniter tip of the fuel igniter at a position exposed to the combustion gases; and a grommet supported by the supporting ring and configured to receive the fuel igniter, wherein the igniter tip terminates at a distal end, and wherein the plurality of channels directs the cooling air on a position at or approximately at the distal end.

\* \* \* \* \*